Patented Oct. 8, 1940

2,216,840

UNITED STATES PATENT OFFICE 2,216,840

PREPARATION OF ARYL MERCAPTANS AND RESULTING COMPOSITION

Lee Cone Holt, Edgemoor, Del., assignor to E. I. du Pont de Nemours & Company, Wilmington, Del., a corporation of Delaware No Drawing. Application June 18, 1938, Serial No. 214,583

5 Claims. (Cl. 260—609)

This invention relates to the production of aryl mercaptans and more particularly to the production of thio-naphthols.

Since no commercially practical process for the introduction of mercapto radicals directly on to a naphthalene nucleus in good yields is known, it has been customary in the past to introduce some other radical containing a sulfur atom (either alone or simultaneously with a mercapto group) and thereafter reduce this said other radical to a mercapto group. Even when such indirect methods are employed, the results are far from satisfactory, and such processes themselves have many undesirable features.

This invention had for an object the design of an economic process for the manufacture of aromatic mercaptans. Further objects were the development of commercial processes for the conversion of naphthalene sulfon chlorides and naphthalene di-sulfides to the corresponding thio-naphthols, and the economic preparation of air stable thio-naphthols in a form suitable for further use. A general advance in the art and other objects which will appear hereinafter are also contemplated.

It has now been found that naphthalene sulfon halides, naphthalene di-sulfides, and other naphthalene compounds having equivalent substituent radicals, may be reduced to the corresponding thio-naphthols in a commercially satisfactory manner if there is present during the said reduction an inert water immiscible organic solvent for the aromatic mercaptan being produced. It has also been found that if the reduction solvent is an organic liquid which is a solvent for the thio-naphthol at room temperature or is a substance which solidifies in such a way as to keep the thio-naphthol well distributed therein upon cooling to ordinary normal room temperatures, the thio-naphthol may be separated in conjunction with the said organic liquid to give a composition which is air stable and highly useful in the arts. While the details of the reduction procedures vary with the compound being reduced, in general the invention is carried out by heating the compound to be reduced in the presence of water and the water immiscible organic liquid at temperatures between 60° and 100° C.

From the following description and specific examples, in which are disclosed certain embodiments of the invention as well as details of what is believed to be the best mode for carrying out the invention, it will be apparent how the foregoing objects and related ends are accomplished.

The quantities are given in parts by weight throughout the application.

Example I

The preparation of beta-thio-naphthol was carried out by adding a high melting paraffin wax (68 parts) commonly known as Asiatic wax, to water (280 parts) in a suitable vessel. The mixture was then heated to 85°–90° C., when the wax became entirely molten and 22.5% hydrochloric acid (175 parts) was added. With an agitator stirring the contents of the vessel, naphthalene-beta-sulfon chloride (68 parts) was introduced. The temperature at this time was 80°–85° C. Immediately afterwards zinc dust (67 parts) was dumped into the reaction mass, and this addition was followed at once by more of the hydrochloric acid (200 parts). The temperature rose rapidly, and when it was just below 100° C. ice was added to maintain a temperature range of 95°–100° C. This temperature condition was continued for one hour after the original violence of the reaction was over. At the end of this time the agitator was stopped, and after a few minutes of standing the perfectly clear molten wax solution of the beta-thio-naphthol was removed from the vessel. A portion of the same was drawn off into casting pans and the remainder passed directly to a flaker.

When a very accurate check is desired, the wax solution can be held in the reactor until an analysis for beta-thio-naphthol is completed. In some instances it may be desirable to adjust the percentage composition of the final product to a definite value by the addition of more wax. It is not necessary to completely separate off all the wax solution as a portion can be left to unite with the next charge.

After the wax solution had been removed, all but 250 to 300 parts of the hot zinc chloride solution was run out of the kettle. This residual solution was left for the next charge, which was started by the addition of Asiatic wax to the already hot zinc chloride solution with the residue of unseparated wax from the previous run.

The final product was a clear, dry solution of beta-thio-naphthol in wax. As such a solution solidifies the beta-thio-naphthol crystallizes out and distributes itself uniformly through the wax. The wax protects the beta-thio-naphthol from oxidation (under ordinary circumstances even air oxidation converts moist beta-thio-naphthol to the undesirable di-sulfide).

Example II

The preparation of 1-mercapto-2-naphthol was carried out by adding the corresponding disulfide (in this case 100 parts of the crude reaction product prepared by fusing beta-naphthol with sodium sulfide and sulfur according to U. S. P. 2,004,728, Example II) to ortho-dichloro-benzene (130 parts), 20° Bé. hydrochloric acid (200 parts) and water (100 parts). This mixture was heated to about 60° C. with vigorous agitation, and zinc dust added in small portions until the yellow color of the reaction mass disappeared and the foam in the reaction vessel became entirely colorless.

The amount of zinc required varies with different lots of crude 1-mercapto-2-naphthol. The amount required is dependent upon the amount of free sulfur and the amount of di-sulfide in the crude. About 25 parts of zinc dust is a fair average. When the reduction was complete the agitation was stopped to allow the reaction mass to separate into layers.

The lower layer, which was a solution of 1-mercapto-2-naphthol in ortho-di-chloro-benzene, was drawn off, heated in a good vacuum until all water had been driven out and then filtered to remove the slight amount of suspended matter. There was thus obtained a perfectly clear, almost colorless, stable solution of 1-mercapto-2-naphthol in ortho-di-chloro-benzene. Such solutions keep indefinitely when stored in closed containers, and absorb oxygen from the air to form the di-sulfide only very slowly when left open to the air.

This reduction may be carried out satisfactorily in a wide range of solvents, but the 1-mercapto-2-naphthol is so insoluble in the solvents of the aliphatic series such as Asiatic wax and kerosene that it separates therefrom as a separate layer upon cooling. Since protection of the final product from oxidation is an important feature of the present invention, it is preferred to carry out the reduction in an organic liquid which is a solvent for the final product at room temperatures or is at least capable of retaining the thio-naphthol distributed throughout itself upon cooling. The chlorinated hydrocarbons have been found to be the most satisfactory of this group. The higher boiling aromatic solvents such as xylene, ethyl benzene and methyl naphthalenes are also satisfactory.

The applicability of the process to the production of other thio-phenols (especially those of the benzene and polynuclear hydrocarbon series) will be apparent to those skilled in the art. Special mention may be made of the advantages of the process when applied to naphthalene-alphasulfon chloride and mixtures of naphthalene-alpha- and beta-sulfon chlorides wherein equally good results are obtained. The crude thio-catechol prepared according to Example I of U. S. P. 2,004,728 has also been purified in a manner similar to that described in the specific examples.

As indicated above, the reduction is preferably carried out in the presence of inert, water immiscible solvents. Organic liquids slightly soluble in water may be used if desired, but this property causes the loss of some of the solvent and thio-naphthol with resulting decrease in efficiency of the process. Solvents not soluble in water to an extent greater than 1% may for practical purposes be considered immiscible therewith. Ordinarily the solvent selected is one which is either a solvent for the thio-naphthol at room temperature or one which solidifies in such a way as to keep the thio-naphthol uniformly distributed therein. Specific mention may be made of paraffin oils (preferably the waxes having a melting point not lower than 55°–60° C.), high boiling aromatic solvents (such as solvent naphthas, xylene, ethyl benzene, methyl naphthalene and the like), chlorinated hydrocarbons (such as chlorinated benzene, particularly ortho-di-chloro-benzene, chlorinated naphthalene and the like), and kerosene.

Because of cost and related factors, hydrochloric acid is the preferred mineral acid.

So far as now appears, zinc dust is the most desirable reducing agent.

Preferably the reduction is carried out in the temperature range 60°–100° C. While the reduction may go at somewhat higher temperatures, there is apparently no advantage in such a procedure. Temperatures about 60° C. seem to be the practical minimum for this step.

The paraffin wax (or equivalent) makes possible the isolation of a mercaptan in such a highly stable form that oxidation is minimized or practically eliminated not only during the reaction but also during the handling in air and subsequent storage. As a result, the product is available and salable when required with little or no conversion to a useless decomposition product. The mercaptan compositions prepared according to this invention whether solid or liquid may be stored indefinitely and used as required.

For many commercial uses the mercaptan compositions may be used directly, as for example, in the softening of rubber wherein the ortho-dichloro-benzene solutions of 1-mercapto-2-naphthol and the Asiatic wax-thio-beta-naphthol compositions, may be milled directly into the rubber. In some cases the mercaptan may be removed from the solvent by extraction with alkali (aqueous sodium hydroxide, for example), and the alkaline solution used in subsequent reactions. In such a case the wax or liquid solvent is available for use in a further reduction reaction. Beta-thio-naphthol is an important dye intermediate, and would be separated from the wax for this use. For the bulk of commercial uses the above described mercaptan compositions are preferred to the free compounds.

In résumé, it may be said that the process of this invention is much superior to those previously known (for example, that described by Krafft & Schonherr, Ber. 22, 824, in which an intermediate difficulty soluble zince sulfinate is formed, and the process of U. S. P. 2,004,728 in which the expensive and corrosive acetic acid is employed). In the reductions of the present invention the consumption of zinc dust is reduced to very little over the theoretical quantity (in the best previously known sulfon chloride reduction processes about 80% excess reducing agent is utilized), the consumption of mineral acid is greatly reduced and the amount of ice necessary for cooling is small in comparison. In addition, in the case of the reduction of the sulfon chlorides the reaction is much more easily controlled.

All of these advantages, together with such others as (1) the avoidance of the formation of difficulty soluble intermediate products, (2) the decreased cost resulting from preventing excessive losses of hydrogen (which occur when a sulfon chloride is added to a hot mixture of hydrochloric acid and zinc) and (3) the simpler, easier and cheaper production of thio-naphthols, operate to give an important time saving in commercial operation.

A more economical production of aryl mercaptans from the corresponding sulfon halides is made possible because gradual addition of reactants and close supervision of the operation are rendered unnecessary.

As many apparently widely different embodiments of this invention may be made without departing from the spirit and scope thereof, it is to be understood that I do not limit myself to the specific embodiments thereof except as defined in the appended claims.

I claim:

1. The process which comprises heating a mixture of ortho-di-chloro-benzene, 20° Be. hydrochloric acid, water and

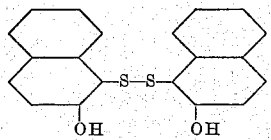

to about 60° C. with vigorous agitation, adding zinc dust gradually until the yellow color disappears from the reaction mass, allowing the reaction mass to separate into layers and separating the solution of 1-mercapto-2-naphthol in ortho-di-chloro-benzene.

2. In the process for preparing thiophenols by the zinc dust reduction of aromatic compounds having a sulfur-containing radical capable of being reduced with zinc dust to the mercaptan radical, the improvement which comprises carrying out the reduction in a mixture of water and an inert, water-immiscible solvent for the thiophenol.

3. The process of claim 2 wherein the compound reduced is a member of the group consisting of naphthalene sulfon halides and naphthalene disulfides.

4. In the process for preparing beta-thionaphthol by the zinc dust reduction of naphthalene-beta-sulfon chloride, the improvement which comprises carrying out the reduction in a mixture of water and a paraffin wax.

5. A new composition of matter comprising essentially a stable oxidation resistant composition in which 1-mercapto-2-naphthol is well distributed throughout ortho-di-chloro-benzene.

LEE CONE HOLT.